July 28, 1964     M. C. EDLUND     3,142,624
NUCLEAR REACTOR AND METHOD OF OPERATING SAME
Filed April 14, 1960     3 Sheets-Sheet 1

INVENTOR.
Milton C. Edlund
BY
ATTORNEY

INVENTOR.
Milton C. Edlund
BY
ATTORNEY

3,142,624
NUCLEAR REACTOR AND METHOD OF OPERATING SAME

Milton C. Edlund, Lynchburg, Va., assignor to The Babcock & Wilcox Company, New York, N.Y., a corporation of New Jersey
Filed Apr. 14, 1960, Ser. No. 22,145
6 Claims. (Cl. 176—18)

This invention relates in general to nuclear reactors wherein a fission chain reaction takes place, and more particularly it relates to a method and apparatus both for operating a nuclear reactor having large quantities of excess fuel therein and for breeding fissionable material.

This application is a continuation-in-part of my pending application, Serial No. 662,458, filed May 29, 1957, now Patent No. 3,081,246 granted Mar. 12, 1963.

In every nuclear reactor there must be arranged a quantity of fissionable material as a fuel and other materials such that there is a sufficient mass to produce a chain reaction. The mass of fissionable material is termed "a critical mass." In order to operate a non-breeder reactor for an appreciable period of time there must be included in the reactor an excess of fuel above the critical mass which represents the fuel which may be consumed during operation of the reactor. As this extra fuel makes available a quantity of neutrons greater than the quantity necessary to perpetuate a controlled chain reaction, these excess neutrons must be absorbed in some manner so that an uncontrolled reaction does not result. The inherent ability of the excess fuel to produce these excess neutrons is generally referred to as "excess reactivity."

The existing methods for the control of excess reactivity in reactors are based on the non-productive consumption of the excess neutrons by either using neutron absorbing materials, other than the fuel or fertile isotopes, or by allowing excessive diffusion or escape of neutrons out of the reactor. These methods of control include movable neutron absorbing control rods, such as hafnium metal, the use of burnable poisons, such as boron, the variation of moderator geometry, such as varying the height of heavy water in a natural uranium heavy water reactor, varying the position of a reflector, and the variation of the amount of fuel in the core such as in homogeneous reactors. These systems either vary the number of neutrons which escape from the periphery of the reactor or nonproductively absorb neutrons within the reactor or vary the amount of fuel in use.

As the fissionable material is consumed the reactor is controlled to maintain criticality for the reduced critical mass by increasing the moderating capacity. Inasmuch as it can be generally said that the critical mass decreases as the energy level of the neutrons approaches the thermal region, the present invention contemplates regulating a reactor by controlling the moderation of the reactor.

A problem that has been faced in the development of nuclear reactors is to achieve a breeder type particularly in the field of thermal reactors. A breeder type reactor is one that converts fertile material into fissionable material producing more fissionable atoms than are consumed in the fission chain reaction. In other words, the breeder reactor is one that has a conversion ratio of greater than unity, where more fissionable atoms are produced than are destroyed.

While it has been theoretically possible to produce a thermal breeder reactor, there are several limiting factors which have made its practical development impossible. One of these factors has been the impossibility of building and shipping a reactor pressure vessel large enough to afford an internal conversion ratio greater than 0.85. Another is that a conversion ratio greater than one cannot be achieved in any fuel cycle which uses pure light water as a moderator. Still another factor which inhibits breeding is the use of reactor control systems which unproductively absorb neutrons thereby reducing the possibility of neutrons, not involved in further fissioning, being captured by fertile material.

To overcome these factors the present invention contemplates combining a core arrangement wherein fertile material is advantageously positioned for purposes of conversion to fissionable material, with a means for regulating a reactor by controlling the moderation in the reactor.

The invention herein is directed to the operation of a nuclear reactor in which the reactor is first set as a critical mass based on a predetermined moderation where the quantity of fuel is the maximum desired.

The invention further provides a method of operating a reactor in which the variable moderation is provided for by using a heavy and light water mixture in which the initial mixture has a high deuterium to hydrogen ratio, and the reactor is controlled by varying the ratio.

Further, it is provided that fertile material is arranged throughout the reactor so that the excess neutrons which are not captured to produce fission are productively captured in rather large quantities by the fertile material to result in a conversion to fissionable material, thus decreasing the net rate at which the fuel is consumed in the reactor and extending its life.

Additionally, the invention provides a method of converting fertile to fissionable material in a nuclear reactor in which a blanket of fertile material is positioned about the core and the reactor is controlled by varying its moderation capacity.

Moreover, the invention contemplates specific apparatus operating in accordance with the invention method which includes means for varying the moderation within the reactor.

Furthermore, the invention also contemplates specific apparatus for a nuclear reactor including means for varying the moderation within the reactor which permits the productive absorption of neutrons in the reactor thereby allowing a conversion ratio of greater than unity.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Nuclear reactors, including their theory and design, are fully described in U.S. Patent 2,708,656 of Fermi and Szilard dated May 17, 1955, and the present invention may be applied to the specific embodiments shown therein. For a definition of the terms used herein reference should be made to "A Glossary of Terms in Nuclear Science and Technology" published April 1953, by the American Society of Mechanical Engineers.

Figure 1:
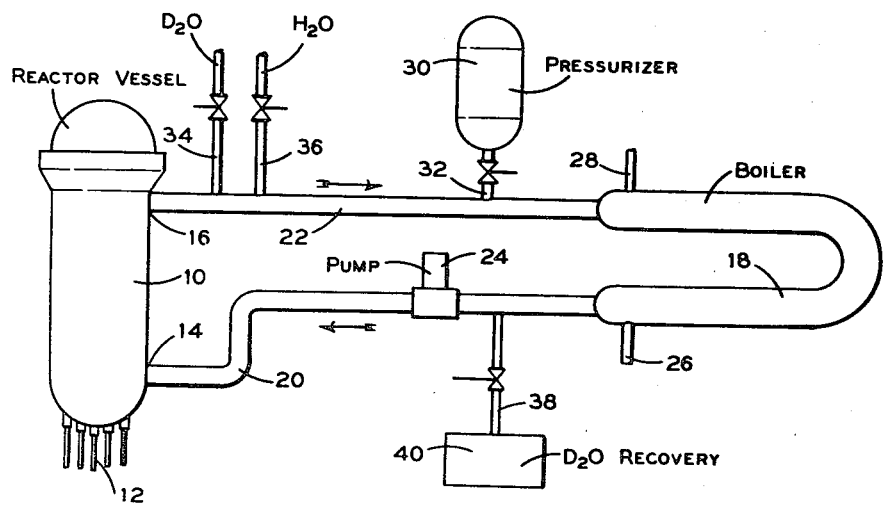
FIG. 1 is a semi-schematic diagram of a reactor system operated in accordance with the present invention.

In FIG. 1 there is schematically shown a pressurized water type nuclear reactor of the type describe in detail in the "Proceedings of the International Conference on the Peaceful Uses of Atomic Energy," volume III, pp. 211 to 234. The reactor 10 is arranged with some control rods 12 and has primary coolant inlet 14 and outlet 16. A U-shaped shell and tube boiler 18 has its tube side connected to the reactor 12 by the delivery line 20 and return line 22. A pump 24 is located in the delivery line and arranged to continuously circulate the primary coolant, water, in a closed flow path through the reactor 10 where it absorbs heat and the boiler 18 where the heat is given to boiling water on the shell side thereof for the generation of steam. Feed water for the boiler enters by the inlet 26 and steam leaves by line 28 for further delivery to a point of use (not shown). A pressurizer 30 is connected to the return line 22 by a valved line 32 to maintain a high pressure on the water so that reactor heat may be transferred to the water coolant in the reactor without boiling.

The reactor is of the well known heterogeneous type and has a core in which bodies of fissionable and fertile material are arranged in distinct form. The fuel mass therein is greater than critical based on light water moderation by an amount necessary to maintain criticality during a predetermined period of operation. Thus the reactor is a thermal type where most fissions occur due to absorption of thermal neutrons; i.e. neutrons which have a mean kinetic energy determined by the operating temperature, which is about 0.025 electron volts at 300° K. The excess of fuel results in an excess reactivity which is a capacity for generating more neutrons than is required to sustain a chain reaction.

The present invention is primarily a method of operating the illustrated reactor in which the excess reactivity of the excess fuel is controlled by changing the neutron slowing-down power or moderation to increase the average neutron energy in the reactor and when fertile material is present to increase the productive resonance capture of neutrons by the fertile material. The slowing-down power of the reactor is its ability to slow the neutrons down from the energy of fission to increase the probability of capture in a fissionable atom. By varying the slowing-down power or moderation of the reactor, control of the reactor is achieved and the conversion rate of fertile to fissionable material is increased.

By way of illustration, the invention method will be applied to the reactor arrangement of FIG. 1. The primary coolant for the reactor 10 comprises a mixture of heavy and light water high in deuterium. The quantity of deuterium present is adjusted until the reactor becomes critical with all of the control rods out of the core. Heavy water is controllably introduced into the return line 16 of the primary coolant system via the valve controlled line 34 and light water is put in by valve controlled line 36. The water mixture is blown down from the delivery line 20 via a valve controlled blow-down line 38 to a heavy water recovery plant 40. The recovery plant separates the heavy water from the light water to make it available to line 34 as required. For a complete discussion of such a heavy water recovery system, see "Production of Heavy Water" edited by G. M. Murph et al., first edition, McGraw-Hill 1955, pp. 17 to 30.

To increase the quantity of deuterium in the system and thus decrease the slowing-down power, heavy water is controllably discharged through line 34 and an equal quantity of the water mixture is removed via line 38. As the fuel in the core is consumed, criticality is maintained by introducing light water via line 36 into the system and removing an equal quantity of water mixture. The specification for such a reactor is as follows:

| | |
|---|---|
| Core diameter | 7 ft. |
| Core height | 8 ft. |
| Reactor power | 610 M.W. of heat. |
| Fuel | U–235 and U–233 as uranium oxide. |
| Fertile material | Thorium as thorium oxide. |
| Uranium loading | 670 kilograms. |
| Thorium loading | 18,000 kilograms of thorium oxide. |
| Metal to water ratio | 0.75. |
| Fuel element rod size | 0.375 inches O.D. |
| Cladding | 0.030 inches of zircaloy-2. |
| Moderator coolant-initially | 90% heavy water and 10% light water. |

Metal to water ratio is the quantity of solid metal to the quantity of water present in the reactor core.

The typical operating procedure for this reactor is to load to 670 kilograms of fuel into the core and to charge the reactor with the heavy water mixture (90/10). Adjust the deuterium to hydrogen ratio until the reactor is just critical as cold. Then bring to temperature by decreasing the D/H ratio. Bring to power by pulling out of the core a small control rod.

Adjust the deuterium to hydrogen ratio downwardly as needed to compensate for fuel burnup and production of fission products. Continue the reactor operation until it can no longer be maintained critical at the opening temperature by lowering the deuterium to hydrogen ratio.

The invention is based on the well known knowledge that the slower the neutron, the greater the probability there is for it to produce a fission in a fissionable atom. It is further well known that the deuterium atom has a lower capacity for slowing down neutrons than does the lighter hydrogen atom. Accordingly, the critical mass of fissionable material for a heavy water reactor can be made greater than the critical mass when using light water as a moderator in internal converter reactors. Accordingly, if light water is added to the heavy water in the reactor, more neutrons will be slowed down through the resonances of fuel and fertile material and the probability of fission occurring increased. Thus, as the number of fissionable atoms decreases due to consumption, criticality may still be maintained by the increased moderating effect of the light water dilution.

It is further noted that fertile materials such as thorium and U–238 have significant resonance capture cross sections in the neutron energy level above that of thermal and in the range of 0.4 to 200 electron volts. The fraction of fission neutrons captured in the resonances of the fertile material can be increased by reducing the moderation in the reactor core; i.e. by shifting the neutron energy spectrum to higher energies. This enables the fertile material to compete more favorably with structural materials for neutrons and as a result increases the conversion ratio and reduces the net fissionable fuel depletion rate.

Figure 2:
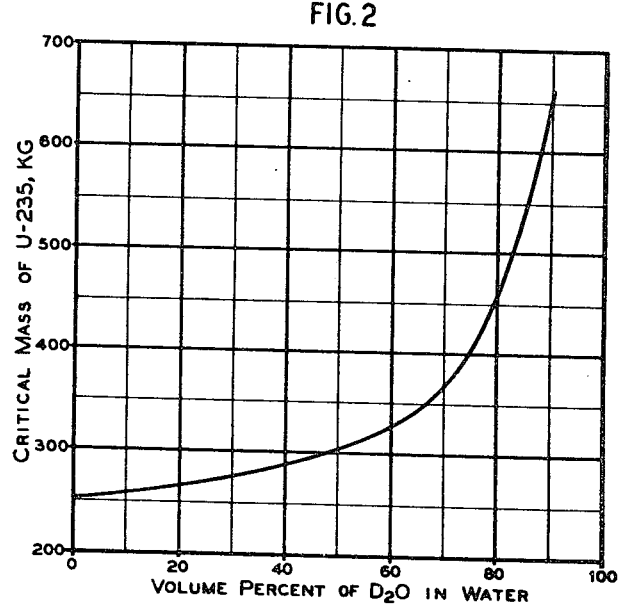
FIG. 2 is a curve showing the variation of critical mass vs. change in moderator of the reactor of FIG. 1 in comparison to prior art reactors.

FIG. 2 illustrates the calculated effect of changing of heavy water percentage on the critical mass of the exemplified reactor. It should be noted that the critical mass changes from 670 kg. to about 260 kg. when moderated with light water only.

The control of the reactor is effected by shifting the neutron energy spectrum and causing more neutrons to be utilized for fertile material conversion and having less neutrons available for thermal fission. The excess reactivity is thus controlled while increasing the conversion rate. Consequently, a more uniform flux distribution may be obtained as well as more operating time between fuel loadings. The following table is the calculated effect of the neutron energy shift:

| Percent $D_2O$ by Volume | Percent Fraction of Fissions in Energy Range of 0.4 to 200 ev. |
|---|---|
| 0 | 12 |
| 50 | 20 |
| 70 | 27 |
| 80 | 30 |
| 90 | 32 |

To illustrate the advantage of the present invention it will be compared to prior art reactors conventionally controlled as follows:

*Reactor A*

Specifications:
- Core diameter _____ 7 ft.
- Core height _____ 8 ft.
- Reactor power _____ 610 M.W. of heat.
- Fuel _____ U–235 and U–233 as $UO_2$.
- Fertile material _____ Thorium as $ThO_2$.
- Metal to water ratio __ 0.75.
- Thorium loading _____ 18,000 kg. of $ThO_2$.
- Rod size _____ 0.375 inches O.D.
- Cladding _____ 0.030 inches of Zircaloy-2.
- Moderator-coolant ____ Pure $H_2O$.
- Control method _____ Conventional (control rods and/or burnable poisons).

*Reactor B*

Specifications:
- Core diameter _____ 15.58 ft.
- Core height _____ 14.5 ft.
- Reactor power _____ 610 M.W. of heat.
- Fuel _____ U–235 and U–233 as $UO_2$.
- Fertile material _____ Thorium as $ThO_2$.
- Thorium loading _____ 18,000 kg. of $ThO_2$.
- Metal to water ratio __ 0.05.
- Rod size _____ 0.375 inches O.D.
- Cladding _____ 0.030 inches Zircaloy-2.
- Moderator-coolant ____ 99.75% $D_2O$–0.25% $H_2O$.
- Control methods _____ Conventional (control rods and/or burnable poisons).

These core specifications represent typical designs of a power reactor system. A low metal to water (m/w) ratio in Reactor B is required to keep the critical mass reasonable. The large size is necessary to secure a power output of 610 M.W. based upon the low m/w and the same average heat flux assumed in A.

An increase in volume percent of $D_2O$ in the water, i.e. an increase in D/H, decreased the slowing-down power and increases the critical mass.

Figure 3:
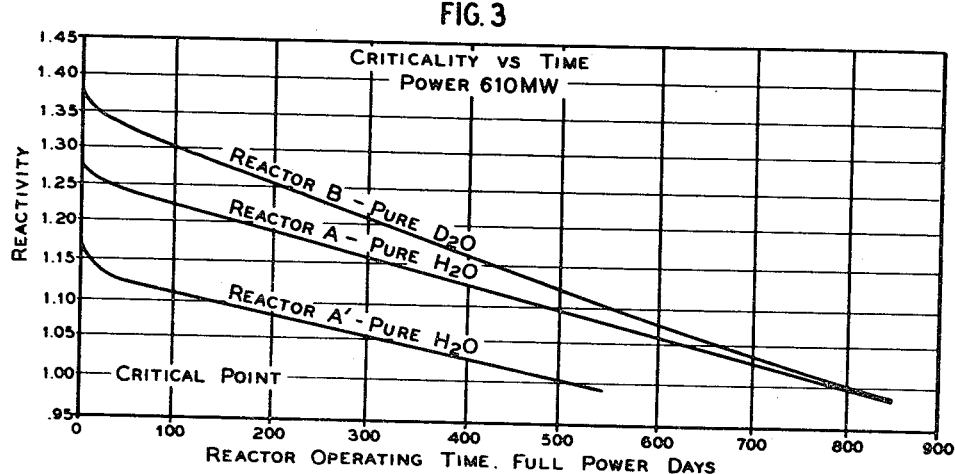
FIG. 3 is a curve showing the variation of criticality vs. time in the reactor of FIG. 1 compared to prior art reactors.

The lifetime of Reactors A, B, and the present invention were calculated on the basis of each core having sufficient initial loading of fuel to exceed the critical mass by approximately 350 kg. FIG. 3 shows the criticality of cores A and B as a function of operating time. Actually these two cores are unrealistic, since a reactivity of approximately 0.20 is normally the maximum value which can be controlled with conventional control rods. This makes lower loadings mandatory and shortens the core life as shown by curve marked Reactor A' in FIG. 3. However, this high initial loading can be achieved in the reactor of the present invention due to the presence of $D_2O$ in the small reactor.

Figure 4:
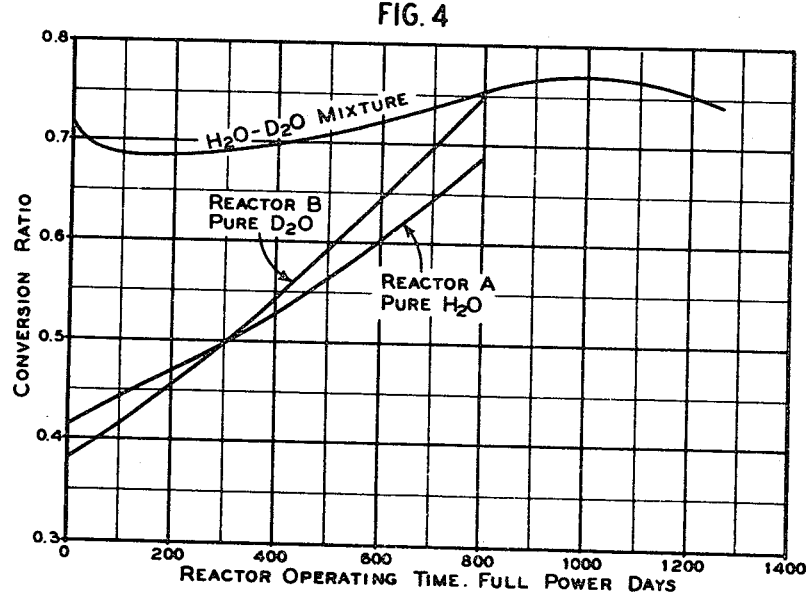
FIG. 4 is a curve showing the conversion ratio of the reactor of FIG. 1 vs. time compared to prior art reactors.

Using the high initial fuel loadings and conventional control methods, the expected core life for Reactor B is 840 days (FIG. 3), while use of the concept of control for which invention is claimed herein extends the expected core life to 1310 days (see FIG. 4). Compare this to the expected life of 540 days if the initial loading is reduced as in Reactor A' of FIG. 3 to provide an initial $k_{eff}$ (reactivity) of only 1.20 and conventional control rods are used. Approximately 300 days of life, 183,000 MWD, can be added by increasing the initial loading sufficiently to secure 350 kg. of initial excess mass instead of complying with the limitation of a maximum $k_{eff}$=1.20. An additional 490 days, almost 300,000 MWD, is added to the expected life due to the increase in conversion ratio obtained by using variation of slowing-down power instead of conventional rods for control.

The significance of this effect on conversion ratio is shown in FIG. 4. A comparison of the average conversion ratio over the entire life for each of the cores reveals:

| Reactor Core | Life, Days | Coolant-Moderator | Average Conversion Ratio |
|---|---|---|---|
| A | 840 | Pure $H_2O$ | 0.53 |
| Invention reactor | 1,310 | $H_2O$–$D_2O$ | 0.71 |
| B | 840 | Pure $H_2O$ | 0.53 |

This clearly shows the benefits of control by changing the fraction of neutrons capture in the resonances of fertile material rather than by changing the non-productive consumption rate of neutron as in conventional methods.

Resonance capture of neutrons increases with a decrease in resonance escape probability, P. The lower the probabilities thus the higher percentage of resonance absorptions are obtained in the invention reactor containing $H_2O$–$D_2O$ mixtures. In order to use the proposed concept of shim control, the core must possess a low value for the resonance escape probability with a large $D_2O$ percent in the water. It is the ability to increase P by increasing the slowing-down power, i.e., decreasing the D/H ratio, that allows control adjustments to keep the reactor critical during operation.

In a uranium-thorium internal converter reactor the control of the reactor by variation of the slowing-down power in the core through variation of deuterium to hydrogen ratio, may increase the potential nuclear lifetime of a 610 M.W. core from 540 days using conventional control methods to 1310 days. This is accomplished by:

(1) Obtaining control of high initial fuel loadings, thus allowing loading of large quantities of excess mass.

(2) Increasing the average conversion ratio by eliminating the non-productive losses of neutrons due to control mechanisms.

In addition to increasing the conversion ratio in the reactors previously considered, it is also possible to effect a breeder nuclear reactor by combining the moderator control of this invention with a reactor arrangement in which the core containing either fissionable or fissionable and fertile material is surrounded by a blanket of fertile material.

To achieve a thermal breeder reactor it should be understood that the fissionable material must contain a certain proportion of U–233 which is bred from thorium. The reason for this being that in a thermal reactor containing only U–235 as the fissionable material there are not sufficient neutrons emitted per neutron absorbed to permit a conversion ratio greater than unity. The necessary proportions of U–233 and U–235 for breeding are dependent on the various parameters of the reactor.

Figure 5:
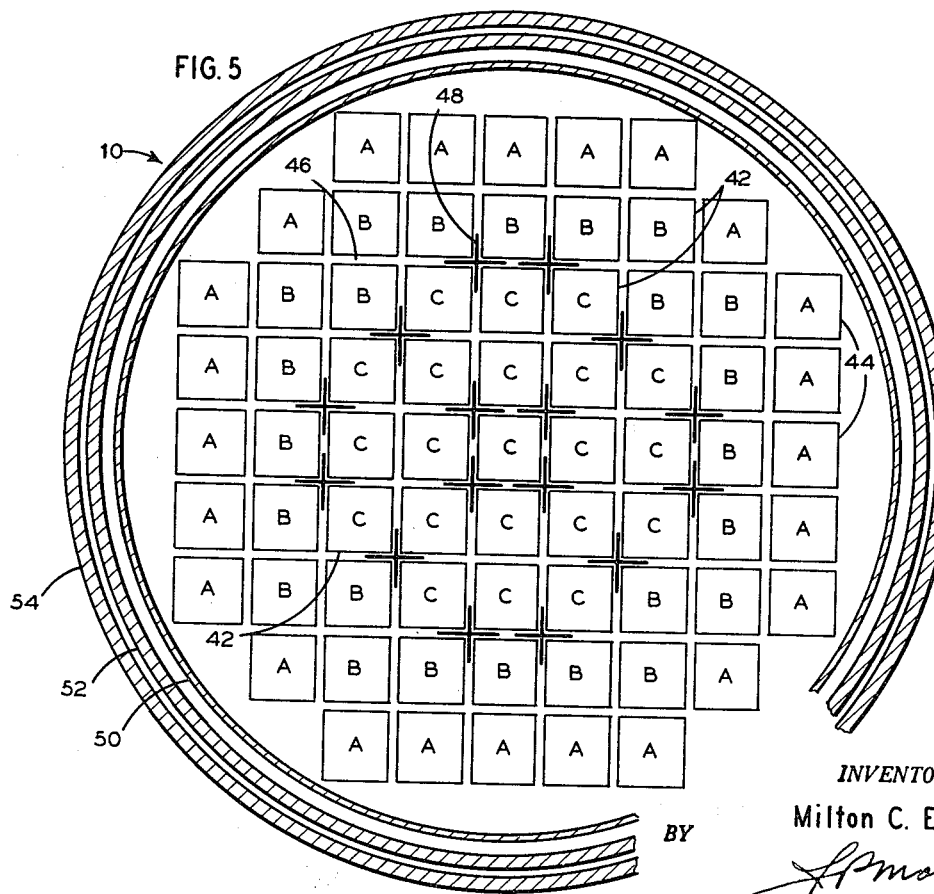
FIG. 5 is a semi-schematic horizontal cross-section of a core arrangement, including a blanket, for a thermal breeder nuclear reactor operated in accordance with the present invention.

In FIG. 5 there is shown a preferred embodiment of the core for a thermal breeder reactor similar to and interchangeable with the reactor shown in FIG. 1. A number of uniformly spaced elongated fuel elements 42 of square cross section are arranged in a square lattice to form a core. The fuel elements 42 are preferably made up of a number of long slender fuel pins (not shown) containing fertile material at each end with a mixture of fertile and fissionable material disposed in between. The fertile material arranged at the ends of the fuel pins provides a relatively thin transverse blanket at each end of the core. Materials such as thorium oxide and uranium oxide provide the fertile and fissionable materials respectively in the fuel elements.

About the lateral periphery of the core containing fuel elements 42 there are a plurality of elongated components 44. These components have substantially the same shape as and are arranged in parallel relationship with the fuel elements 42. The components 44, however, contain only fertile material such as thorium oxide which, is preferably contained within pins as in the fuel elements. This arrangement of the components provides a longitudinally extending blanket about the sides of the core. The combination of the end blanket within the fuel elements 42 and the side blanket formed by the components 44 provides a layer of fertile material completely surrounding or enclosing the core.

The spaced arrangement of the fuel elements and components provides flow channels 46 so that the reactor coolant can flow about the fuel elements and components as well as through them.

The fuel elements 42 are divided into two longitudinally extending uniform fuel concentration zones each having a substantially different fissionable to fertile material weight percent ratio. In FIG. 5 the components 44 forming the blanket are designated with the letter A and the fuel elements are identified by either the letter B or C. The fuel elements marked C form a centrally arranged inner fuel concentration zone surrounded by fuel elements marked B which form a concentrically arranged outer fuel concentration zone. The components marked A form a concentric ring about the fuel concentration zones. The ratio of fissionable to fertile material is higher in the outer fuel concentration zone than in the inner zone. The purpose of this variance is to flatten the power distribution within the core.

While the fertile material blanket has been described in combination with a core in which the fissionable to fertile material ratio is varied radially in two zones, it is not restricted to this arrangement. This blanket arrangement can be used with a core in which there is not zone loading or with one in which the fissionable to fertile material ratio is varied both radially and axially.

In the core a group of elongated cruciform shaped, movable control rods 48 are arranged in a regular symmetrical pattern. The control rods 48 are longitudinally positionable within the flow channels 46 so that they can be selectively removed and reinserted into the core. These control rods hold down the excess reactivity due to fuel inventory to keep the reactor from going critical prior to start-up, they provide a means for shutting-down the reactor, and when desired, they can be used either to shim or to regulate the reactor or to do both.

About the core there is disposed a pair of thermal shields 50, 52 and a wall 54 of the reactor itself. Since FIG. 5 is intended only to illustrate the general arrangement of the fissionable and fertile material within the core and blanket, there is not shown any of the core shroud or baffles which normally would be disposed about the core or, in this case, about the blanket.

This thermal breeder reactor operates in a reactor system as shown in FIG. 1. The primary coolant used is a variable mixture of light and heavy water and is introduced into and flows through the reactor system in the manner described previously for the reactor system of FIG. 1. The specification for such a reactor is as follows:

Equivalent core diameter____ 99.5″.
Core height_____ 96″.
Active fuel length_____ 88″.
Fuel element blanket
  length—each end_____ 4″.
Reactor power_____ 1100 M.W.
Fissionable material_____ U–235 and U–233 as uranium oxide.
Fertile material_____ Thorium as thorium oxide.
Fissionable material
  loading_____ 500 kg. 450 kg. U–233, 50 kg. U–235.
Fertile material
  loading_____ 27666 kg.
Metal to water ratio_____ 1.1.
Pins per fuel element_____ 285.
Pin diameter_____ 0.420 inches O.D.
Pin pitch_____ 0.525 inches.
Fuel pin cladding_____ 0.030 inches of zircaloy-2.
Moderator coolant—
  initially_____ 80% light water ($H_2O$), 20% heavy water ($D_2O$).
Zone loading of fissionable material:
  Fuel elements B_____ 3.24 weight percent of fissionable material.
  Fuel elements C_____ 2.30 weight percent of fissionable material.

As previously mentioned, it is not possible to achieve a breeder reactor using U–235 alone, it must be used along with a bred fissionable material. In the thermal reactor just specified which uses thorium as the fertile material and breeds U–233, it is not possible to achieve breeding unless a sufficient quantity of U–233 is present at the commencement of the core lifetime. As a practical matter, since U–233 can only be obtained through the conversion of thorium, a number of core lifetimes must be gone through until sufficient U–233 is available. In the reactor core, described herein and illustrated in FIG. 5, it will take about five core lifetimes starting out with U–235 as the fissionable material until it is possible to have enough U–233 in combination with U–235 to effect a breeder reactor on the sixth core. The quantities of fissionable material set forth in the table above are those that would be present in a core when sufficient U–233 is available to provide a breeder reactor.

In order to illustrate the manner in which the thermal breeder reactor in the present invention operates, the following is a description of the starting-up and operating procedure for this reactor:

(1) The core as shown in FIG. 5 is arranged with all the control rods in their full-in position to maintain the reactor subcritical in a cold clean condition. The primary coolant system is charged with a mixture of $H_2O$–$D_2O$ in which the volume fraction of $D_2O$ is slightly in excess of 20%, the percentage amount required to control the fission chain reaction when the core first goes critical.

(2) The ratio of $H_2O$–$D_2O$ is adjusted until the proper mixture is achieved at which the core will go critical (80% $H_2O$–20% $D_2O$).

(3) The control rods are removed so that the reactor can be brought up to the desired power level.

(4) The ratio of $H_2O$ to $D_2O$ is adjusted so that the reactor is critical at the operating temperature and all the control rods are removed from the core with the possible exception of a single control rod required for fine control and Xenon over-ride.

(5) During reactor operation, in addition to fuel burn-up and the conversion of fertile into fissionable material, there is a building-up of fission products. These fission products have a tendency to poison or unproductively absorb thermal neutrons, those available for the fissioning process. Therefore, to maintain the chain reaction, sufficient thermal neutrons must be available for both fissioning and fission product absorption. For this reason to increase the probability of more neutrons being available for fissioning the ratio of $H_2O$–$D_2O$ must be increased to thereby slow-down more neutrons to thermal energy. The effect of this process is that the quantity of $D_2O$ gradually decreases and that of $H_2O$ increases during the lifetime of the core.

(6) At the end of core lifetime the ratio of $H_2O$ to $D_2O$ will be in the vicinity of 90–95% $H_2O$ to 10–5% of $D_2O$. Theoretically, the volume of $D_2O$ could be reduced to zero at the end of core lifetime, however, to provide proper control of the reactor, a minimum amount of $D_2O$ is maintained in the moderator-coolant.

(7) When it is required to shut the reactor down, the control rods are reinserted into the core.

The $H_2O$–$D_2O$ mixture can be used both for shimming, making coarse adjustments in the reactivity of the reactor as well as for regulating, making fine adjustments in the reactivity of the reactor.

The neutron balance of this core is as follows:

Fission neutrons absorbed—

| | |
|---|---|
| U–233 | 1.000 |
| U–234 | 0.100 |
| U–235 | 0.100 |
| U–236 | 0.020 |
| Np–237 | 0.005 |
| Hydrogen and structure | 0.045 |
| Xe and Sm | 0.059 |
| Pa | 0.020 |
| Other fission products | 0.057 |
| Thorium | 1.079 |
| Total | 2.485 |
| Leakage | 0.020 |

Fission neutrons produced—

| | |
|---|---|
| U–233 | 2.290 |
| U–235 | 0.204 |
| Thorium | 0.011 |
| Total | 2.505 |

By correcting the thorium absorption for Pa loss and assuming about half percent (0.5%) further loss in chemical processing, the breeding ratio or conversion of thorium to uranium (U–233) is about 1.05.

Figure 6:
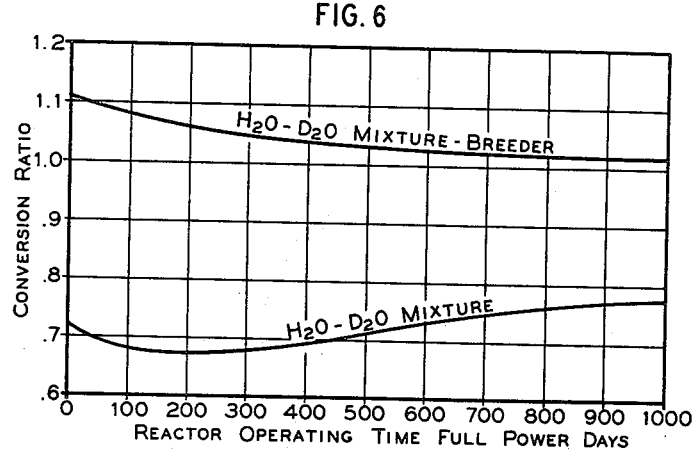
FIG. 6 is a curve showing the conversion ratio vs. operating time of the reactor of FIG. 5 as compared with that of the reactor of FIG. 1.

In FIG. 6 the conversion ratio of the thorium breeder reactor is compared with that of the reactor discussed earlier, where both are using moderator control. These curves indicate the increase achieved in the conversion ratio by using moderator control with the combined core and blanket.

This combination of a blanket about the core and moderation control make it possible to achieve a thermal breeder reactor in the size range of reactors that are presently being used. The moderator control is a departure from the previous control arrangements in that it promotes breeding by making available more neutrons for conversion purposes. Where previously control was achieved by nonproductive absorption the moderation control makes the neutrons, not required in the fission reaction, available for breeding by regulating their resonance escape probability. The blanket of fertile material provides for the productive absorption of neutrons in the resonance absorption range as they escape from the core. Therefore, the combination of moderator control and a blanket of fertile material will permit breeding of fissionable material in a reactor without increasing its size.

While the blanket has been described as enclosing both the sides and ends of the core, it is contemplated that the blanket is not restricted to this arrangement and would be effective if only positioned about the sides of the core.

Although the invention has been illustrated with reference to a pressurized water reactor it is equally applicable to other types.

For instance, a fast neutron breeder reactor of the type described in volume III, pp. 135 to 142, Proceedings of the International Conference on the Peaceful Uses of Atomic Energy, may be arranged so that slowing-down power or moderation is added to the reactor as fuel is consumed to, in effect, decrease the critical mass. The increase in moderation may be furnished by graphite or beryllium rods inserted as required to maintain criticality.

Prior art reactors may be adapted to use the present invention method by simply substituting a variable moderator for the prior art systems of control. In that regard the following are some of the many variable moderators which may be used by varying the quantity of:

(1) Beryllium dust in fluidized graphite dust.
(2) Glass beads in light water.
(3) Graphite dust suspended in light water.
(4) Steam in graphite rods or matrix.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A method of operating a converter nuclear reactor whereby the maximum number of neutrons emitted in the fission chain reaction and not required to maintain the chain reaction are available for the conversion of fertile to fissionable material comprising arranging a quantity of fissionable material as a core to provide a critical mass based on a predetermined quantity of moderation, surrounding the core with a blanket of fertile material, placing a combination of moderator materials comprising a mixture of light and heavy water in the reactor, adjusting the mixture of light and heavy water to achieve the predetermined amount of moderation required to provide a critical mass in the core, establishing a fission chain reaction within the reactor, and regulating the reactor during its operation by controllably varying the ratio of light and heavy water within the reactor to vary the quantity of moderation therein, whereby the reactor is maintained critical while permitting the productive absorption of neutrons in the reactor to convert fissionable material.

2. A method of operating a converter nuclear reactor whereby the maximum number of neutrons emitted in the fission chain reaction and not required to maintain the chain reaction are available for the conversion of fertile to fissionable material comprising arranging a quantity of fissionable and fertile material as a core to provide a critical mass based on a predetermined quantity of moderation, grouping the bodies of fissionable and fertile material in the core into at least two symmetrically disposed fuel concentration zones with each zone having a substantially different weight percent ratio of fissionable to fertile material, surrounding the core with a blanket of fertile material, placing a combination of moderator materials comprising a mixture of light and heavy water in the reactor, adjusting the mixture of light and heavy water to achieve the predetermined amount of moderation required to provide a critical mass in the core, establishing a fission chain reaction within the reactor, and regulating the reactor during its operation by controllably varying the ratio of light and heavy water within the reactor to vary the quantity of moderation therein, whereby the reactor is maintained critical while permitting the productive absorption of neutrons in the reactor to convert fissionable material.

3. A method of operating a converter nuclear reactor whereby the maximum number of neutrons emitted in the fission chain reaction and not required to maintain the chain reaction are available for the conversion of fertile to fissionable material comprising arranging a quantity of fissionable material in a number of separate uniformly shaped bodies as a core to provide a critical mass based on a predetermined quantity of moderation, surrounding the core with a blanket of fertile material arranged in a number of separate uniformly shaped bodies, inserting control rods into the core to maintain it subcritical, placing a combination of moderator materials comprising a mixture of light and heavy water in the reactor, adjusting the mixture of light and heavy water to achieve the predetermined amount of moderation required to provide a critical mass in the core, removing the control rods from the core to establish a fission chain reaction, and regulating the reactor during its operation by controllably varying the ratio of light and heavy water within the reactor to vary the quantity of moderation therein, whereby the reactor is maintained critical while permitting the productive absorption of neutrons in the reactor to convert fissionable material.

4. A method of operating a converter nuclear reactor whereby the maximum number of neutrons emitted in the fission chain reaction and not required to maintain the chain reaction are available for the conversion of fertile to fissionable material comprising arranging a quantity of fissionable and fertile material in a number of separate uniformly shaped bodies as a core to provide a critical mass based on a predetermined quantity of moderation, grouping the bodies of fissionable and fertile material in the core into at least two symmetrically disposed fuel concentration zones with each zone having a substantially different weight percent ratio of fissionable to fertile material, surrounding the core with a blanket of fertile material arranged in a number of separate uniformly shaped bodies, inserting control rods into the core to maintain it subcritical, placing a combination of moderator materials comprising a mixture of light and heavy water in the reactor, adjusting the mixture of light and heavy water to achieve the predetermined amount of moderation required to provide a critical mass in the core, removing the control rods from the core to establish a fission chain reaction, and regulating the reactor during its operation by controllably varying the ratio of light and heavy water within the reactor to vary the quantity of moderation therein, whereby the reactor is maintained critical while permitting the productive absorption of neutrons in the reactor to convert fissionable material.

5. A nuclear reactor comprising a quantity of fissionable and fertile material disposed in a number of separate uniformly shaped longitudinally extending fuel elements arranged in a regular lattice to form a core, said fuel elements positioned in a centrally arranged inner fuel concentration zone and at least one outer fuel concentration zone concentrically arranged about said inner zone, each zone having a substantially different uniform fissionable to fertile material weight percent ratio, a quantity of fertile material disposed in a number of separate uniformly shaped longitudinally extending components surrounding the core to form a blanket thereabout, a plurality of individually removable longitudinally extending cruciform shaped control rods disposed in a uniform arrangement within said core, a combined moderator coolant made up of a mixture of heavy water and light water disposed within said core, and regulator means for varying the ratio of heavy water to light water in the moderator to thereby vary the moderation capacity in the reactor to maintain criticality.

6. A nuclear reactor comprising a quantity of fissionable and fertile material disposed in a number of separate uniformly shaped longitudinally extending fuel elements arranged in a regular lattice to form a core, fertile material located at each end of said fuel elements to provide a transversely arranged blanket at each end of said core, said fuel elements positioned in a centrally arranged inner fuel concentration zone and at least one outer fuel concentration zone concentrically arranged about said inner zone, each zone having a substantially different uniform fissionable to fertile material weight percent ratio, a quantity of fertile material disposed in a number of separate uniformly shaped longitudinally extending components surrounding the core laterally to form a blanket thereabout, a plurality of individually removable longitudinally extending cruciform shaped control rods disposed in a uniform arrangement within said core and having the longitudinal axes thereof arranged in parallel with the longitudinal axes of said fuel elements, a moderator made up of a mixture of heavy water and light water, and regulator means for varying the ratio of heavy water to light water in the moderator to thereby vary the moderation capacity in the reactor to maintain criticality.

References Cited in the file of this patent

UNITED STATES PATENTS

| | | |
|---|---|---|
| 2,743,225 | Ohlinger | Apr. 24, 1956 |
| 2,857,324 | Boisblanc | Oct. 21, 1958 |
| 2,861,033 | Treshow | Nov. 18, 1958 |
| 2,928,779 | Weills et al. | Mar. 15, 1960 |
| 2,936,273 | Untermyer | May 10, 1960 |
| 3,001,923 | Tunicliffe et al. | Sept. 26, 1961 |

FOREIGN PATENTS

| | | |
|---|---|---|
| 114,151 | Australia | May 3, 1940 |
| 753,130 | Great Britain | July 18, 1956 |

OTHER REFERENCES

Iskenderian, International Conference on the Peaceful Uses of Atomic Energy, vol. 3, pp. 157–168, Aug. 1955.

International Conference on the Peaceful Uses of Atomic Energy, vol. 3, pp. 136, 137, 218, 253, 333, and 335, Aug. 1955.

HW–44525, Physics Research Quarterly Report, July 25, 1956, Office of Technical Services, U.S. Dept. of Commerce, Wash. 25, D.C., pages 28 and 29.

Kruzhilin, International Conference on the Peaceful Uses of Atomic Energy, vol. 2, pp. 436, 437, Aug. 1955.